Dec. 19, 1961 N. K. STENBERG Re. 25,095

DRY-FEED CHLORINATOR AND THE LIKE

Original Filed Dec. 2, 1955 6 Sheets-Sheet 1

INVENTOR.
NYYRIKKI K. STENBERG
BY
Leonard L. Kalish
ATTORNEY.

DRY-FEED CHLORINATOR AND THE LIKE

Original Filed Dec. 2, 1955 6 Sheets-Sheet 2

INVENTOR.
NYYRIKKI K. STENBERG
BY
Leonard L. Kalish
ATTORNEY.

DRY-FEED CHLORINATOR AND THE LIKE

Original Filed Dec. 2, 1955 6 Sheets-Sheet 3

INVENTOR.
NYYRIKKI K. STENBERG
BY Leonard L. Kalish
ATTORNEY.

DRY-FEED CHLORINATOR AND THE LIKE

Original Filed Dec. 2, 1955 6 Sheets-Sheet 4

INVENTOR.
NYYRIKKI K. STENBERG
BY
Leonard L. Falish
ATTORNEY.

DRY-FEED CHLORINATOR AND THE LIKE

Original Filed Dec. 2, 1955 6 Sheets-Sheet 5

INVENTOR.
NYYRIKKI K. STENBERG
BY
Leonard L. Kalish
ATTORNEY.

DRY-FEED CHLORINATOR AND THE LIKE
Original Filed Dec. 2, 1955
6 Sheets-Sheet 6
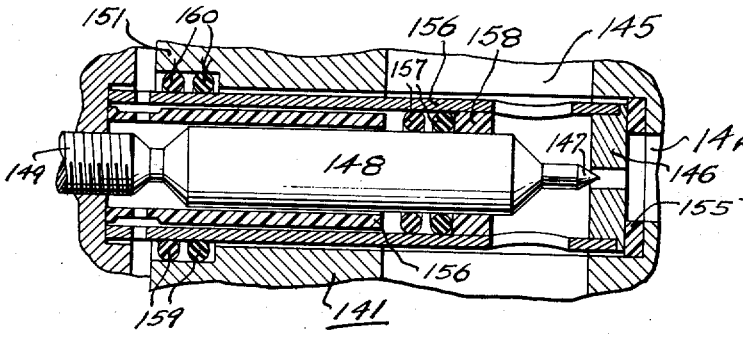
Fig. 8-a
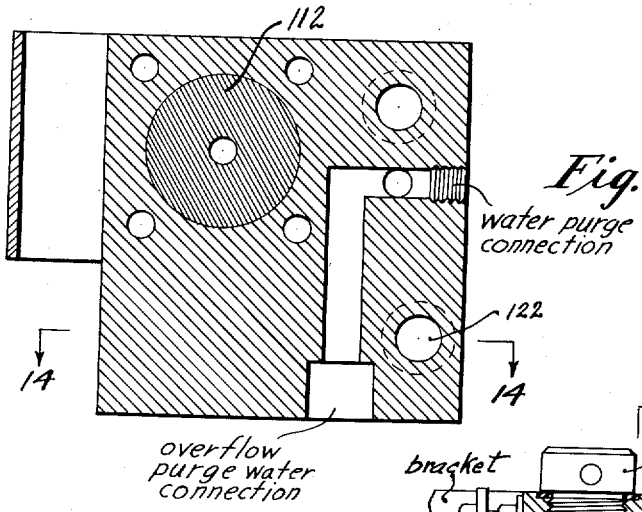
Fig. 12
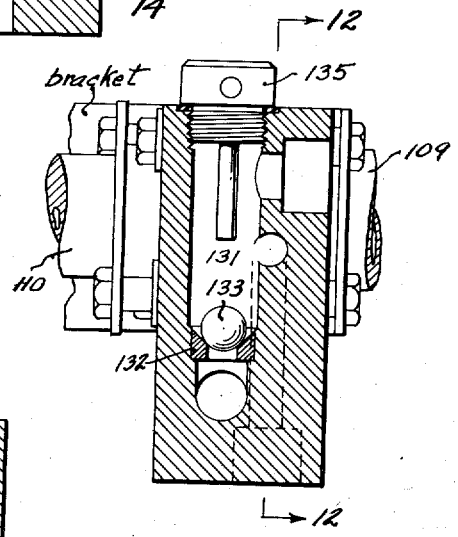
Fig. 13
Fig. 14
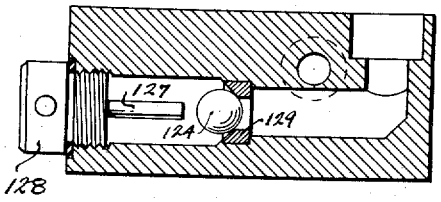
INVENTOR.
NYYRIKKI K. STENBERG
BY
Leonard L. Kalish
ATTORNEY.

United States Patent Office

Re. 25,095
Reissued Dec. 19, 1961

25,095

DRY-FEED CHLORINATOR AND THE LIKE

Nyyrikki K. Stenberg, Roslyn, Pa., assignor to Fischer & Porter Company, Hatboro, Pa., a corporation of Pennsylvania Original No. 2,957,494, dated Oct. 25, 1960, Ser. No. 550,552, Dec. 2, 1955. Application for reissue Oct. 26, 1960, Ser. No. 65,246
12 Claims. (Cl. 137—559)

Matter enclosed in heavy brackets [ ] appears in the original patent but forms no part of this reissue specification; matter printed in italics indicates the additions made by reissue.

The present invention relates to chlorinators and its objects are effective dry-feed chlorination and greater dependability, durability and effectiveness under operating conditions as well as under any abnormal conditions which may be encountered, and also greater economy of manufacture and compactness.

FIGURE 12 represents a section on line 12—12 of FIGURE 13.

FIGURE 13 represents a section on line 13—13 of FIGURE 11.

FIGURE 14 represents a section on line 14—14 of FIGURE 12.

Figure 1:
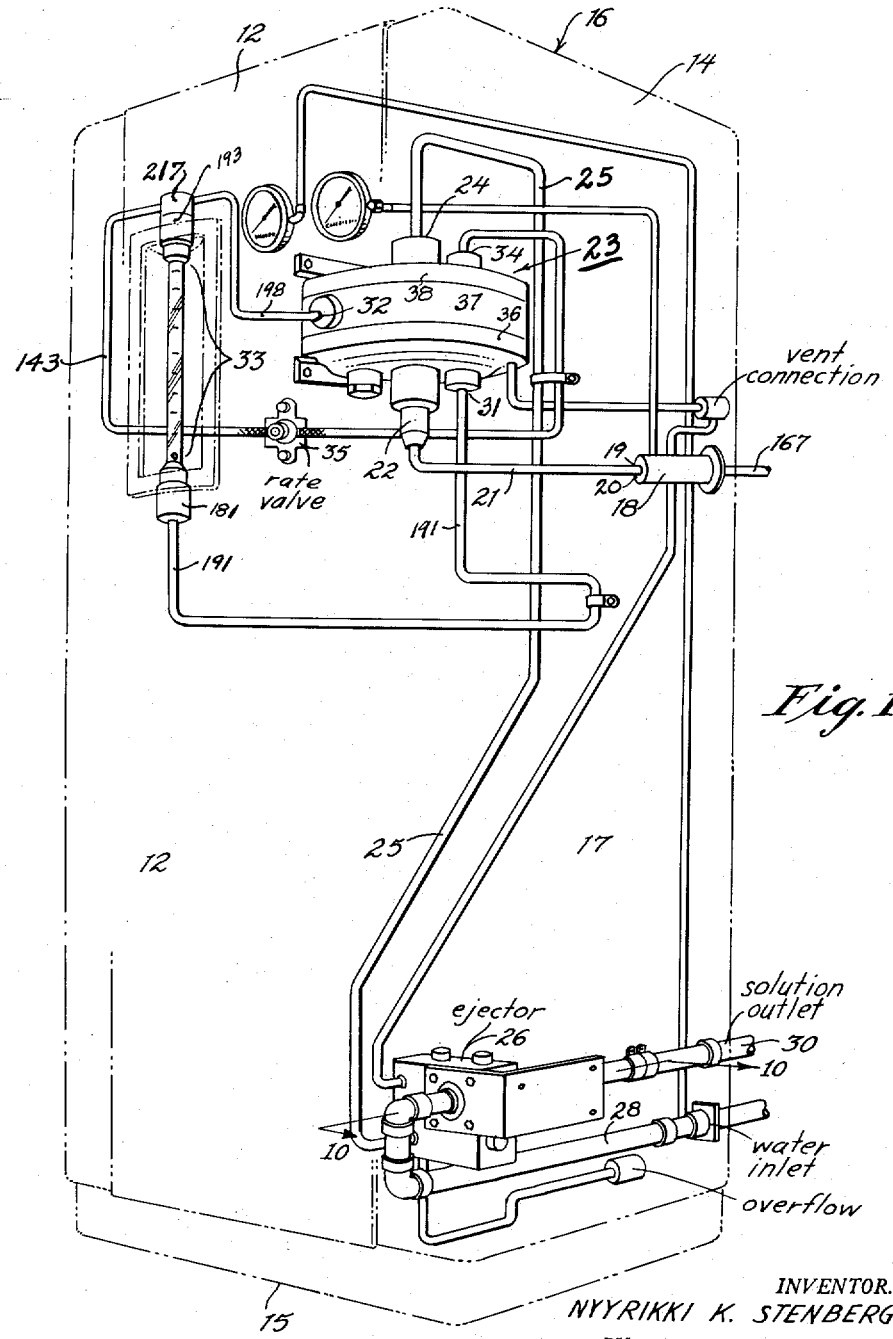
FIGURE 1 represents a perspective view of a chlorinator embodying the present invention (with the housing in phantom).

The chlorinator of the present invention may be mounted or housed within a housing such as the housing 11, having a front wall 12, side walls 13 and 14, bottom 15 and top 16 and rear panel 17. However, the side, top and rear panels may be omitted, and the front panel alone used, for application to or mounting within some other instrument-panel, or wall or the like.

The casing 11 and its various walls are preferably made of a polyester and glass-fiber molding, preferably a polyester impregnated fiber-glass cloth molded and set under pressure.

On the rear wall 17 the chlorine inlet and filter unit 18 is mounted, to which chlorine supply is connected at 19.

On the outlet 20 of the chlorine inlet and filter unit 18, the inlet tube 21 is connected with the inlet nipple 22 of the regulator designated generally by the numeral 23. From the outlet 24 of the regulator 23, the regulator is connected by non-metallic tubing 25, with the ejector 26, to the inlet 27 of which the water-supply 28 is connected, and to the outlet 29 of which the solution-discharge 30 is connected.

Figure 5:
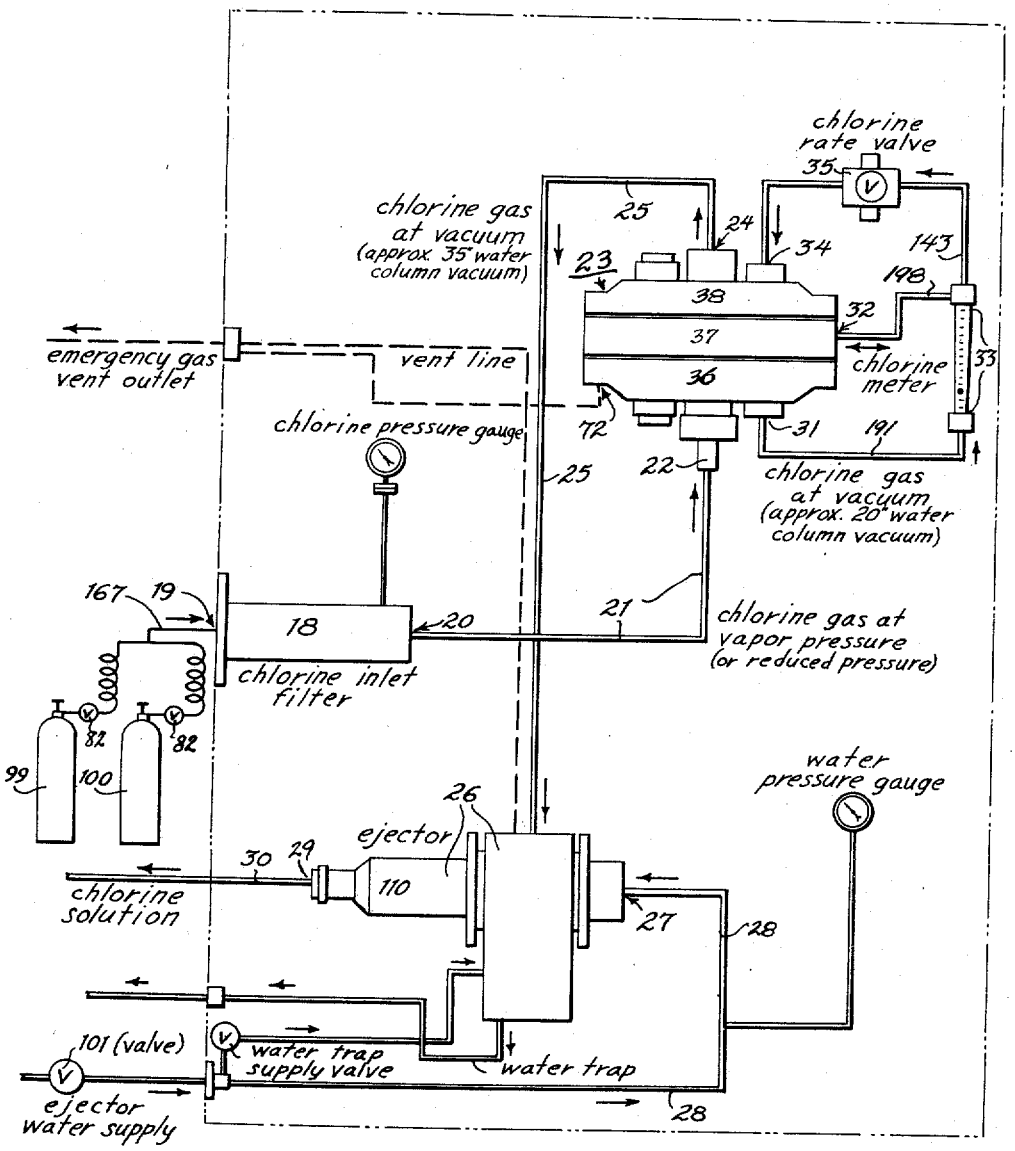
FIGURE 5 represents a schematic diagram of the chlorinator.

Between the outlet 31 of the regulator 23 and the inlet 32 thereof, the rate-of-flow meter 33 is interposed, in the manner indicated in FIGURES 1 and 5, and between the inlets 32 and 34 thereof the chlorine rate-valve 35 is interposed in the manner indicated in FIGURES 1 and 5.

The chlorine regulator 23 comprises a housing, preferably formed in three complementary and registering sections 36, 37 and 38, as indicated particularly in FIGURES 1, 4–6.

Between the inlet section 36 of the regulator-housing and the central section 37, a diaphragm 39 is interposed in sealed relation thereto; preferably formed of an inert material, such as "Teflon" or the like, while between the center section 37 and the discharge section 38 of the housing a similar diaphragm 40 is mounted in sealed relation thereto.

The housing members 36, 37 and 38, as well as all the parts of the regulator, are preferably formed of a synthetic plastic sufficiently inert in respect to chlorine (both dry and moist), and sufficiently strong to withstand the mechanical stresses. "Uscolite," made by the United States Rubber Company is a suitable plastic. Other parts of the regulator are made of the same or similar plastic, with the exception of a few of the elements thereof hereinafter particularly mentioned, as, for instance, springs and the inlet-sleeve 22 and some of the valve members pointed out more particularly hereinafter.

The diaphragm 39 is flanked by the more or less rigid and form-retaining discs 41 and 42, which are held tightly to the two surfaces of the diaphragm 39 by means of the plug 43 which extends through the disc 42 and is threaded into the disc 41, and has a washer or sealing ring 44 between its head 45 and the disc 42, so as to form a gas-tight seal preventing the passage of gas through the diaphragm around the plug 43.

The plug 43 carries (by threaded interengagement) a sleeve 46, which houses a compression spring 47 surrounding the stem 48 of a valve 49, urging said valve upwardly or away from the plug 43. The end of the stem 48 is provided with a head 50, which may be engaged by the lower in-turned ends of the sleeve 46, so as to carry the valve with it when the diaphragm 39 and plug 43 move downwardly.

The inlet nipple 22, preferably formed of silver, has an inner enlarged sleeve portion 51, for housing the valve-closing compression spring 53. A Teflon or similar inert plastic valve-member 54, is abutted against the inner end of the enlarged portion 51 of the silver chlorine-inlet 22, or this valve-seat 54 may be telescoped into and indeed threaded into the enlarged silver shell 51. A spring-abutment 55 is superimposed on the top of the spring 53 (this spring-abutment 55 preferably having a hole through its center for the reception of the stem 57 of the valve 56), and a valve 56, having a guide-stem 57, and a depressor-extension 58, is interposed between annular seat 59 of the valve-member 54 and the spring-abutment 55, as shown in FIGURE 6.

The depressor-extension 58 of the valve 56 abuts against the plug 43 when the diaphragm 39 and the plug 43 carried thereby are moved (by gas pressure) towards the valve 56, thereby to unseat it, against the force of the spring 53.

Figure 6:
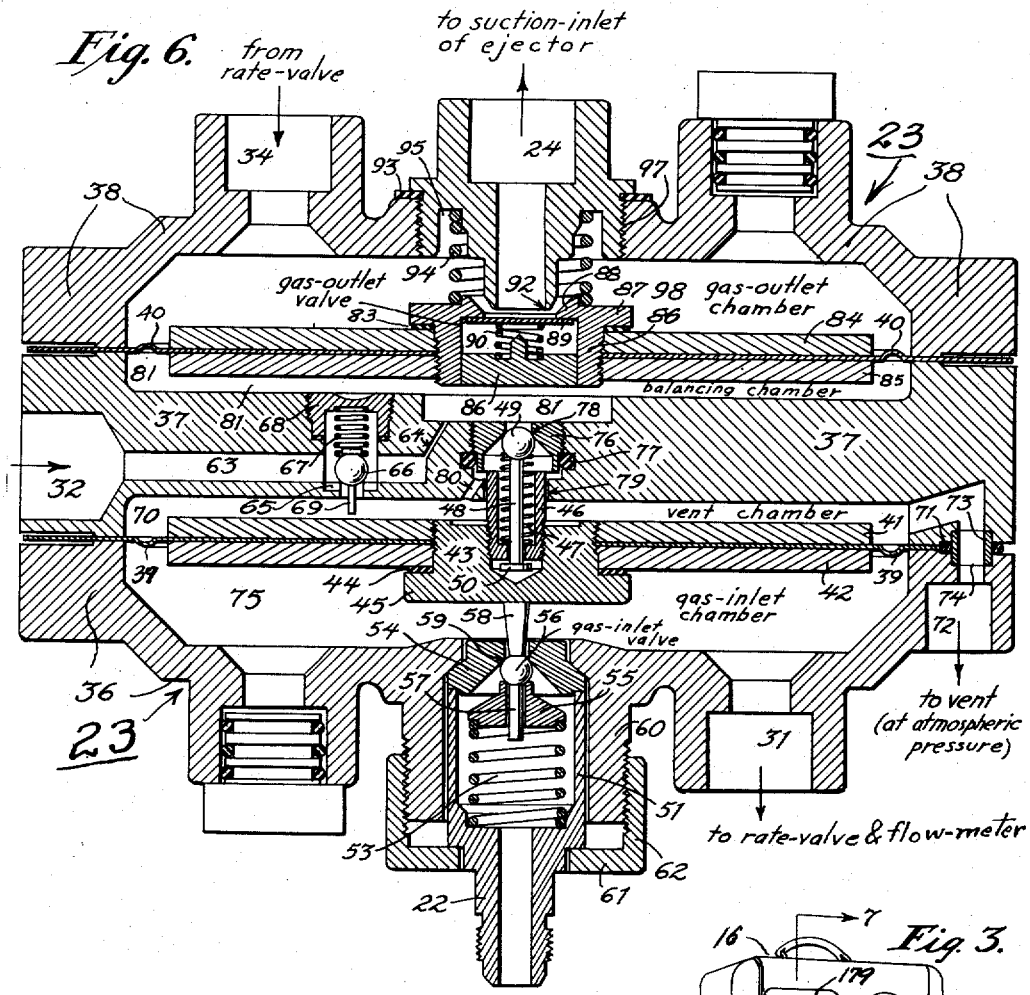
FIGURE 6 represents a cross-sectional view of the regulator portion of the chlorinator of the present invention.
Figure 4:
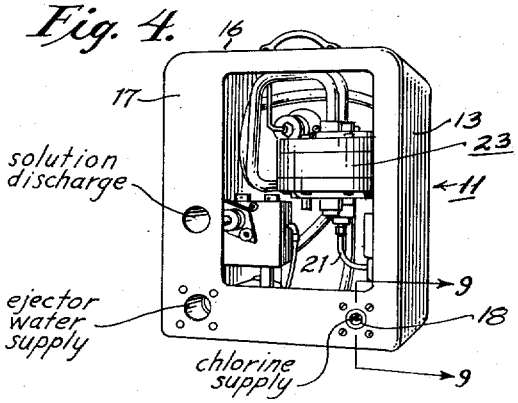
FIGURE 4 represents a perspective view of the chlorinator shown in FIGURE 3, but viewed from the rear thereof.
Figure 3:
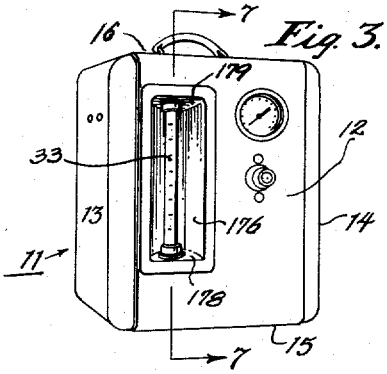
FIGURE 3 represents a perspective view of another chlorinator, similar to that shown in FIGURES 1 and 2, but of a portable type.

The silver inlet (22 and 51) is retained in the inlet portion 60 of the housing member 36, by means of a metallic collar 62, whose in-turned flange 61 engages the shoulder intervening the two differently diametered portions of the silver inlet, and the collar 62 is screw-threaded onto the outer surface of the inlet portion 60, as indicated in FIGURE 6.

The central housing section 37, has therein the chlorine inlet 32 and the passage 63 extending therefrom and the passage 64 communicating with the latter and with the low-vacuum side 81 of the diaphragm 40. Within the wall of the central section 37, and communicating with the passage 63, a valve-seat 65 is provided, against which the valve 66 is adapted to be seated by the spring 67, held in place by the plug 68 screw-threaded into the central section 37, as indicated in FIGURE 6. The valve 66 is provided with an unseating extension or stem 69, adapted to contact the diaphragm-flanking disc 41 when the diaphragm 39 is moved to its extreme position towards the valve 66, thereby to unseat the valve 66 when the diaphragm 39 is so deflected to an extreme or abnormal position.

The chamber 70, on one side of the diaphragm 39, is vented to the atmosphere through the passageway 74 and outlet 72, with a tube or sleeve 73 intervening the sections 37 and 36, to form the passageway 74, and with an O-ring 71 surrounding the sleeve 73 and compressed between the juxtaposed portions of the housing members 36 and 37 to form a gas-seal therebetween, around the sleeve 73.

The chamber 75 on the other side of the diaphragm 39 communicates with the outlet 31 leading to the rate-of-flow meter 33 and also communicates with the chlorine supply, through the valve-seat member 54 and valve-seat 59 and through the chlorine-inlet sleeve (22 and 51).

A valve-seat member 76 is mounted in the housing section 37, as indicated in FIGURE 6, screw-threadedly affixed therein, and sealed by a suitable O-ring 77. The valve 49 is adapted to seat against the valve-seat 78 of the valve-seat member 76, and is adapted to be normally held thereagainst in a closed position, by the valve-closing spring 47. The sleeve 46 (carried by the plug 43 and by the diaphragm 39) is adapted to pass freely through the opening 79 in the housing member 37, so that it may move freely in relation to said housing member with the movements of the diaphragm 39 and the plug 43.

With the normal deflections of the diaphragm 39 and with the normal movements of the plug 43, the valve 49 will remain firmly seated on its valve-seat 78, by the force of spring 47 as well as by the atmospheric pressure effective through the vent-outlet 72, and the chamber 70 and the passage 80 which communicates with the valve-seat member 76. However, when the diaphragm 39 (and its discs 41 and 42) and the plug 43 are deflected to an abnormal extent in a direction away from the valve 49 (and away from the valve 66), the valve 49 will be unseated from its seat 78, by engagement of the head 50 of the valve-stem 48 with a lower in-turned flange of the sleeve 46, whereby the chamber 81 beneath the diaphragm 40 will be vented to the atmosphere through the valve-seat member 76 and through the passages 80, 70 and 73 and vent-outlet 72. This serves to break any undue amount of vacuum which may develop in the system when the chlorine supply is shut off (by means of the valve 82) so as to prevent the water from backing up into the regulator because of such excess vacuum.

The diaphragm 40 is flanked by the generally form-retaining discs 84 and 85, held together by the plug 86, which extends through the disc 84 and is screw-threaded into the disc 85, and is sealed by means of the gasket 83 interposed between the disc 84 and the head 87 of the plug; thereby to prevent the leakage of gas from one side of the diaphragm 40 to the other side thereof, past the plug. The plug 86 has an in-turned flange 88, forming a retainer for the valve 89, which is pressed thereagainst by the spring 90. The valve 89 is held against the in-turned retainer-flange 88, to hold the valve 89 in an inoperative position, against the force of the spring 90, when the diaphragm 40 and the plug 86 are retracted.

The plastic outlet member 24 is preferably screw-threaded into the outlet section 38, as indicated at 97, with a gasket 93 interposed between its flange and its housing to insure gas-tight seal. A spring 94 interposed between the spring-seat recess 95 (formed on the inner side of the outlet member 24) and the plug 86, urges the plug 86 and the diaphragm 40 away from the outlet 24 and away from the outlet valve-seat 92 formed on the inner end of the outlet member 24, in juxtaposition to the valve-member 89.

When the diaphragm 40 and plug 86 are deflected towards the valve-seat 92, by the difference in pressure in the chamber 81 and the chamber 98 being sufficient to overcome the force of the spring 94, then the valve (89 and 92) reduces the flow of gas to the ejector.

The spring 94 is of such strength, in relation to the area of the diaphragm 40 and the pressure-difference on opposite sides of the chlorine rate-control valve 35, as to maintain a constant rate-of-flow determined by the opening of the rate-control valve 35. This is accomplished by the adjustment of the position of the valve 89 in relation to the valve-seat 92, by a balance of the pressure-differential (applied to the area of the diaphragm 40) against the force of the spring 94.

The following is the operation of the chlorinator of the present invention.

One of the chlorine tanks 99 or 100 (each connected to the inlet 22 either directly or through chlorine inlet filter 18) is turned on by the valve 82. The gas enters beneath the spring-seated and gas-pressure-seated inlet valve 56. If the water-supply valve 101 is not turned on, so that there is no vacuum created by the ejector 26, then (there being no vacuum in the chamber 75 beneath the diaphragm 39) the diaphragm 39 and the plug 43 will not be moved towards the valve-depressing extension 58 of the valve 56, so that the valve 56 will remain seated upon its seat 59 and thus bar the entrance of chlorine into the regulator. However, when the requisite vacuum is developed in the chamber 75, by the flow of water through the ejector, then the pressure on opposite sides of the diaphragm 39 will be so unbalanced in the direction of the valve 56 as to cause the diaphragm to move towards said valve and to press against the extension 58 thereof and to unseat it from the valve-seat 59 and thus admit chlorine into the chamber 75 to such an extent as will establish a balance between the gas pressure in chamber 75 and the force of the spring 53.

From the chamber 75 the chlorine flows directly through the outlet 31 to the lower or smaller end of the rate-of-flow meter 33 and upwardly therethrough both into and through the chlorine rate-control valve 35 and into the inlet 34 and into the chamber 98 (above the diaphragm 40), as well as into inlet 32 and into the chamber 81 (below the diaphragm 40). The rate of chlorine application is governed by the setting of the chlorine rate-control valve 35, to change the opening thereof; the valve 35 acting as a variable orifice with the pressure-differential thereacross being maintained constant by the diaphragm 40 and valve 92 and 89 (whenever the ejector is functioning and there is a flow of gas through the regulator, as admitted by the valve 56). In this normal operating condition, the chlorine rate-control valve 35 and the diaphragm 40 and the valve 89 and valve-seat 92, and the spring 94, together form a constant-flow regulator whose rate-of-flow is determined by the setting of the valve 37, in the manner hereinabove stated.

In the normal operating conditions, the vacuum in the chamber 98 is of the order of thirty-five inches of water, while the vacuum in the chambers 81 and 75 is of the order of twenty inches of water column.

However, if the ejector ceases to function or its vacuum-producing capacity is greatly reduced, the valve 56 will close and thus bar the further supply of chlorine through the regulator.

If, on the other hand, the vacuum should become excessive, as, for instance, if the chlorine is shut off at the cylinder-valve 82, while the water left turned on, or if excess vacuum is produced by the absorption of the chlorine in the water, then such excess vacuum will move the diaphragm 39 and plug 43 in a direction away from the valve-seat 78, and thus unseat the valve 49 and vent the chamber 81 to the atmosphere, as above stated, so as to prevent the water being drawn into the regulator, by closing the valve 89 against its valve-seat 92 by the application of atmospheric pressure to the chamber 81.

The ejector 26 (FIGURES 10 and 11) includes a main body 105, having a central chamber 106, with an entrance 107 at one side thereof and with an exit 108 on the other side thereof.

A flanged nipple 109 is mounted on the inlet side of the housing 105, to form the water-inlet 27 of the ejector, while the similarly flanged discharge nozzle 110 is mounted on the other side of the housing 105, entering the exit-opening 108 thereof.

The rear cylindrical sleeve portion 111 of the nozzle 110 is internally screw-threaded, to receive the water-jetting member 112 which is threaded thereinto, with a spacer-ring 113 therebetween, whereby the exact spacing between the tip of the water-jet nozzle 114, and the inlet 115 of the outlet nozzle may be set to the optimum distance by changing the washer 113, namely, by selecting a washer of any particular thickness to make the adjustment.

A series of circumferentially distributed radial apertures 116 are provided in the sleeve 111, whereby the chlorine from the chamber 106 may pass into the jetted stream of water passing between the jet-nozzle 114 and the entrance 115 of the discharge nozzle 110.

Figure 10:
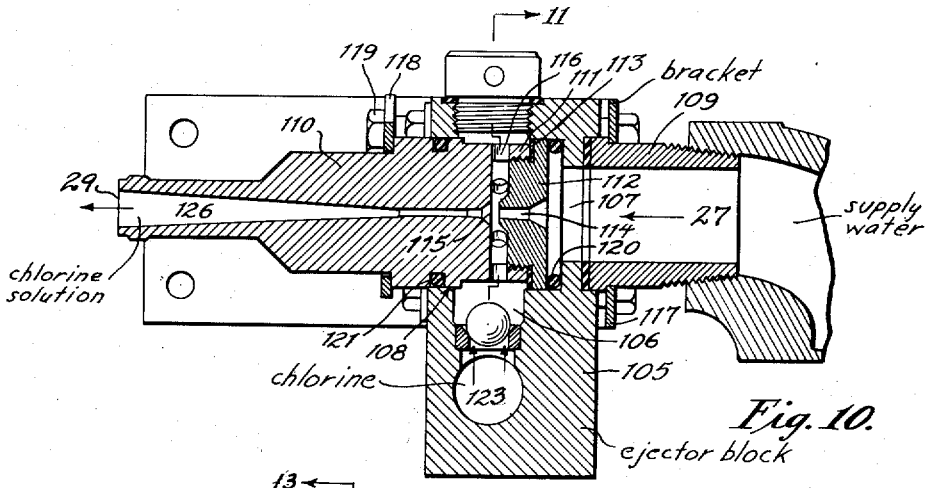
FIGURE 10 represents a central, vertical cross-sectional view of the ejector on line 10—10 of FIGURE 1.
Figure 11:
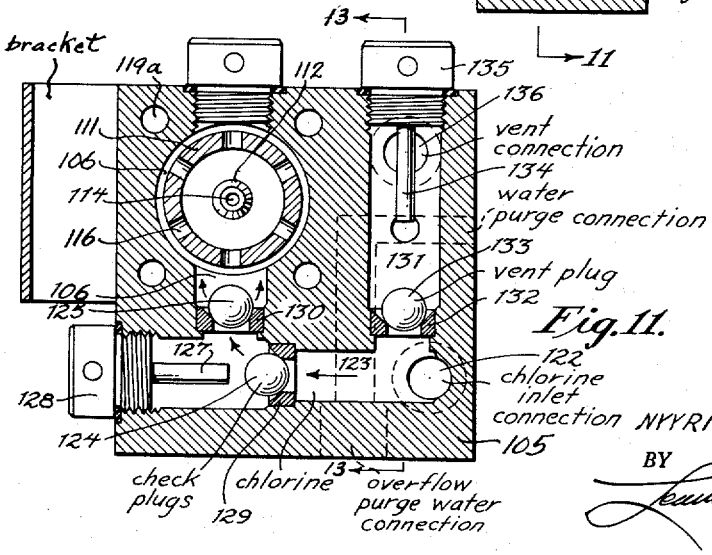
FIGURE 11 represents a section on line 11—11 of FIGURE 10.

Clamp-rings 117 and 118 engage the corresponding exposed flanges of nipple 109 and of the discharge-nozzle 110, in the manner indicated in FIGURE 10, and a series of bolts 119 extend through said rings 117 and 118 and through holes 119a in the body 105, to draw them together, thereby to keep the nipple 109, nozzle 110 and nozzle 112 in assembled relation to each other and to the ejector-body 105. O-rings 120 and 121 serve to establish fluid-tight seals between the nozzle members 112 and 110 and the body 105.

The chlorine-conduit 25 enters the ejector-body 105 through the inlet 122, from whence it passes through the passageway 123, and past the check-valve 124 and past the check-valve 125, into the chamber 106, from where it is drawn into the mixing passageway 126 of the discharge-nozzle 110, from which the water and chlorine mixture or solution is delivered to the solution-pipe 30 (FIGURE 5).

A stop 127, carried by the screw-plug 128, serves to limit the travel of the check-valve 124.

The valve-seats 129 and 130, for the check-valves 124 and 125, are preferably made of a non-corrosive material or one inert to chlorine or aqueous chlorine solution, and preferably made of "Teflon," while the main body 105 may be made of "Uscolite."

Communicating with the passageway 123, is a passage or chamber 131, through the valve-seat 132; upon which rests the check-valve 133. A stop-stem 134, carried by the screw-plug 135, serves to limit the travel of the check-valve 133. From the chamber or passage 131, a vent-opening 136 is extended, from which chlorine may be vented if pressure develops in the chlorine line 25 or in the chamber 123, which normally should be under sub-atmospheric pressure.

So, also, if pressure develops in the chamber 106 due to the inability of the water entering through the nipple 109 fully to discharge through the nozzle 110 (without back-pressure), then the check-valves 124 and 125 prevent the water from backing into the chlorine system.

Figure 8:
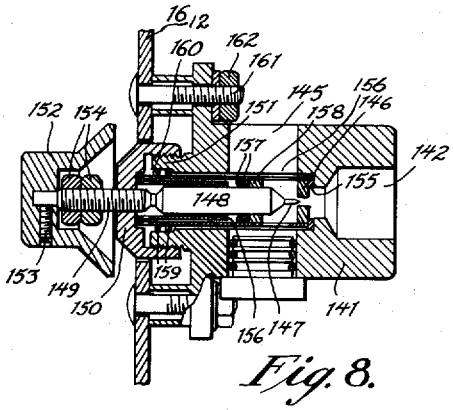
FIGURE 8 represents a cross-sectional view through the rate-valve, and FIGURE 8–a represents an enlarged cross-sectional view of the centralmost portion thereof.
Figure 9:
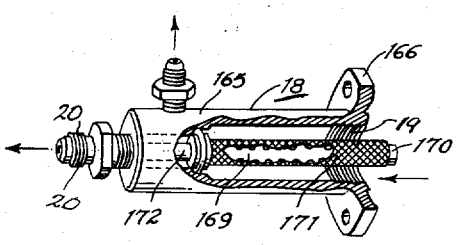
FIGURE 9 represents a cross-sectional view through the chlorine inlet and filter.

The rate-valve 35, shown in cross-section in FIGURE 8, includes a body 141, with an outlet 142 to which the pipe 143 is connected, and a pair of inlet-openings 145 (one of which is plugged), with a valve-seat 146 intervening said inlet and outlet. Juxtaposed to the valve-seat 146 is a needle-valve 147 carried by the stem 148.

The stem 148 has a screw-threaded extension 149 which is screw-threaded into the cap 150, which, in turn, is screw-threaded to the sleeve 151 of the housing 141. To the stem 149 a knob 152 is affixed by means of set-screw 153 or by any other suitable means. A pair of lock-nuts 154 are also provided on the screw-threaded stem-extension 149, whereby the advancement of stem 148 and of the needle-valve 147 towards the valve-seat 146, may be limited, so as to limit the extent to which the orifice (formed between the needle-valve 147 and the valve-seat 146) may be reduced. Thus by moving the two nuts 154 closer to the cap 150, they may be caused to abut against the cap and prevent the further advancement of the needle-valve 147 toward the valve-seat 146.

Between the cap 150 and the shoulder 155 in the body 141, a sleeve 156 is interposed, and within the sleeve 156 a pair of O-rings 157 are placed, to form a seal between the sleeve and the stem 148. A ring 158, fixed within the sleeve 156, may serve as a stop, to confine the O-rings 157. A pair of outer O-rings 159 are interposed between the outer surface of the sleeve 156 and the bore 160 in the sleeve-like portion 151 of the housing 141, to seal the outer surface of the sleeve to the body.

In this manner, the escape of chlorine from the system under any condition, as well as the admission of air into the chlorine system (due to the fact that the chlorine is normally under sub-atmospheric pressure), is prevented.

The bolts 161 and nuts 162, serve to fasten the housing or body 141 of the rate-valve 35 to the front wall 12 of the housing of the chlorinator.

The chlorine inlet and filter 18 includes an outer body portion 165 having a flange 166, by which it is fastened to the wall 17 of the housing of the chlorinator. The chlorine, from the tanks 99 and 100 is connected, by means of the pipe 167, to the main body 165, by being screw-threaded into the screw-thread opening 19. Within the housing or body 165 is a tubular filter member 169, comprising generally a rigid, perforated metallic sleeve or tube 170, closed at its outer end, and surrounded by suitable filter-covering 171 such as a closely braided fine-wire mesh of chlorine-resistant metal or non-metal. The chlorine enters through the outer filter-member 171 and then through the perforated inner sleeve 169, whence it passes into the central delivery tube 172 and then through the nipple 20, to which the pipe 21 is connected.

The rate-of-flow meter 33 is mounted in a recess in the front-wall 12 of the chlorinator-housing 11. This meter-recess may be formed as a separate molded plastic housing-member 175 inserted into and fastened in a correspondingly shaped opening in the front-wall 12, or it may be molded integrally with the front-wall 12. The housing-member 175 includes side-walls 176 and 177, a bottom-wall 178 and the top-wall 179 and rear-wall 180. The sides 176 and 177 and the rear-wall 180 may merge into each other in a more or less semi-circular wall, as a part of a cylinder.

Figure 7:
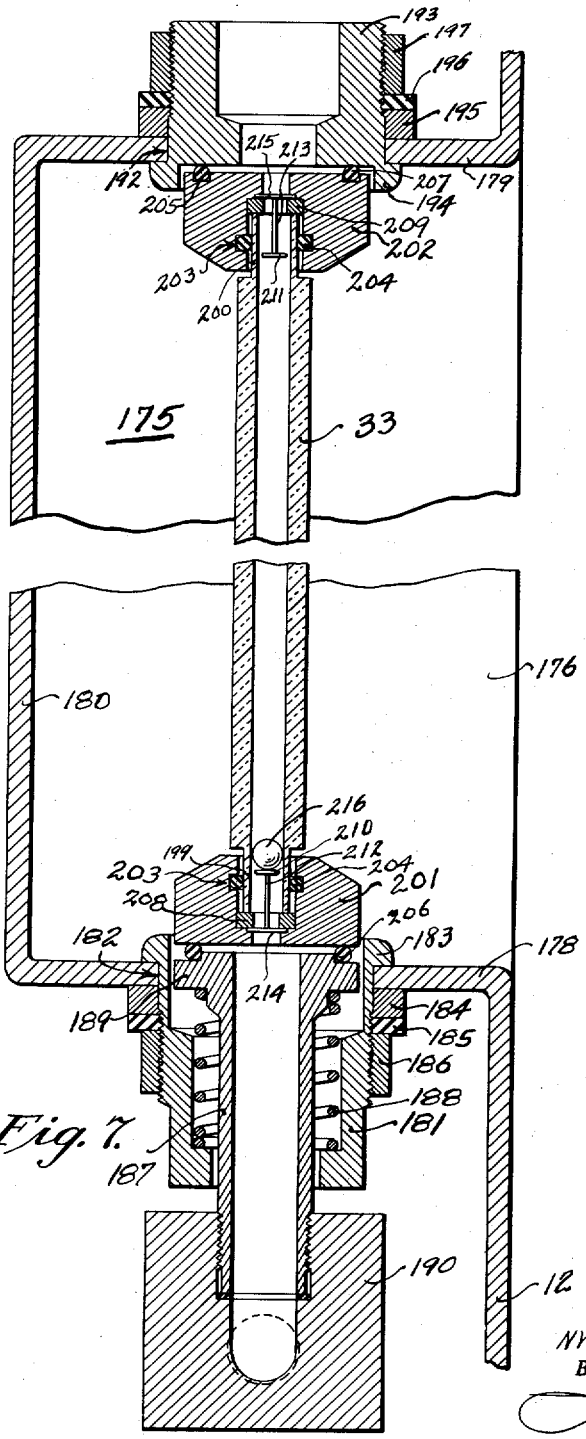
FIGURE 7 represents a cross-sectional view through the rate-of-flow meter (shown in FIGURES 2 and 3).
Figure 2:
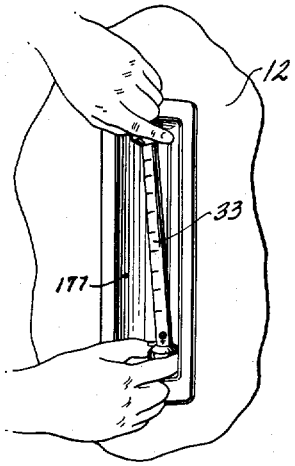
FIGURE 2 represents a perspective view of the rate-of flow meter in the housing, and the manner of its insertion and removal.

A generally tubular spring-housing 181 is mounted in an opening 182 in the bottom-wall 178 of the meter-housing 175, as indicated in FIGURE 7, and is fastened to said lower wall 178 by means of the flange 183 thereof, the washer 184 and the resilient washer 185, and the nut 186 threaded onto the outer threaded surface of the spring-housing 181.

A movable tubular meter-clamping member 187 extends through the spring-housing 181 and is urged upwardly by the spring 188 interposed between the lower in-turned end of the spring-housing 181 and the flange 189 of the meter-clamping member 187. A pipe-fitting 190, screw threaded or otherwise secured to the free end of the movable tube 187, may be provided to serve as a connection for the tube or pipe 191, extending from the regulator-outlet 31 to the rate-of-flow meter 33.

In an opening 192 in the upper wall 179 of the meter-housing 175, a stationary meter-clamping member 193 is affixed by means of its flange 194, washer 195, resilient washer 196 and nut 197; in a manner similar to that in which the spring-housing 181 is affixed to the lower wall 178.

To the meter-clamping member 193, the tube 143 (leading to the rate-valve 35) and the tube 198 (leading to the inlet 32 of the regulator 23), may be connected by means of any suitable pipe-connection or fitting 217.

The rotameter-tube 33 is tapered, with its small end down and its larger end up (although in the drawing this taper is not shown, because the taper is too slight to be shown), and has its ends reduced as at 199 and 200.

Two similar tube-end sealing members or fittings 201 and 202 are provided, each with a central bore having ring-receiving groove 203, into which an O-ring 204 is inserted, to form a sealing-engagement with the ends 199 and 200 of the tube 33.

The sealing members 201 and 202 may also be provided with ring-receiving grooves 205, to receive the O-rings 206 and 207, although one of the O-rings, as, for instance, the lower O-ring 206, may be centered by a slight off-set on the flange 189 of the movable meter-clamping member 187.

Washers 208 and 209 of a slightly yieldable plastic material are inserted into the bore of the members 201 and 202, abutting the ends of the interior shoulder therein, and it is against these washers that the ends of the glass tube 33 are abutted, as indicated in FIGURE 7.

The float-stops 210 and 211 are carried by rigid stems 212 and 213, which, in turn, are carried either by a perforated disc or other similar spider devices 214 and 215, which are clamped between the washers 208 and 209 and the aforementioned shoulders within the bore of the members 201 and 202, whereby said float-stops are held in position.

The float 216 (of suitable material and of suitable weight and diameter) is provided within the tube 33, so that the flow of chlorine, upwardly through the tube 33, will position the float 216 to indicate the rate of flow of the chlorine. Suitable calibrations, either directly on the tube 33 or upon a scale adjacent thereto, serve to give a value to the position of the float, indicative of the rate of flow.

To remove or insert the tube 33, it is pressed down so as to compress the spring 188 (moving the member 187 and its flange 189 downwardly), and while so depressed, the upper member 202 is brought clear of the flange 194 of the member 193, and then the tube 33 and its end-fittings 202 are cocked or tilted outwardly, to clear the meter-housing 175, whereupon the tube can be removed. To re-insert the tube 33, it is again angled, with its lower end pressing against the flange 189 of the spring-urged member 187, and this member is depressed until the upper fitting 202 can pass beneath the flange 194.

As the system is entirely under vauum under all ordinary conditions (the chlorine being shut off the moment the vacuum is broken or if pressure is developed), the seals effected by the O-rings (FIGURE 7) will safely seal the chlorine within the meter.

Having described the invention, the following is claimed:

1. A *suction-responsive* dry-feed gas-inducting system including [vacuum] *a suction*-producing [means] *liquid-ejector having a suction-inlet and a suction-responsive feed-regulator including a housing having therein* a gas-inlet chamber, a gas-outlet chamber, [and] a balancing chamber in operative juxtaposition to said outlet chamber and in constant communication with the aforementioned gas-inlet chamber, a vent chamber in operative juxtaposition to said gas-inlet chamber and vented to the atmosphere, a gas-inlet valve in communication with said *gas*-inlet chamber, a gas-outlet valve in communication with said *gas*-outlet chamber and with [said vacuum-producing means] *the suction-inlet of said liquid-ejector* and a rate-valve operatively interposed between said gas-inlet chamber and said *gas*-outlet chamber, said *gas*-inlet valve being arranged to be opened by the [vacuum] *suction* produced by said [vacuum-producing means] *liquid-ejector*, and means for maintaining a generally constant pressure-differential between said *gas*-outlet chamber and said balancing chamber.

2. A *suction-responsive* dry-feed gas-inducting system including [vacuum] *a suction*-producing [means] *liquid-ejector having a suction-inlet*, a gas-inlet chamber, [a gas-outlet chamber, and balancing chamber in operative juxtaposition to said outlet chamber and in constant communication with the aforementioned inlet chamber], a vent*ing*-chamber in operative juxtaposition [to said inlet chamber] *thereto* and vented to the atmosphere *and a gas-inlet diaphragm separating said two chambers*, a gas-inlet valve in *operative* communication with said *gas*-inlet chamber [a gas-outlet valve in communication with said outlet chamber and with said vacuum-producing means] and *arranged to be operated in one direction by said gas-inlet diaphragm, a gas-outlet chamber, a chamber in operative juxtaposition thereto and a gas-outlet diaphragm separating said two chambers, a passageway forming a constant communication between said gas-inlet chamber and said gas-outlet chamber*, a rate-valve operatively [interposed between said inlet chamber and said outlet chamber, said inlet valve being arranged to be opened by the vacuum produced by said vacuum-producing means means for maintaining a generally constant pressure-differential between said outlet chamber and said balancing chamber, *disposed in said passage-way, a gas-outlet valve in operative communication with said gas-outlet chamber and with the suction-inlet of said liquid-ejector and arranged to be operated in one direction by said gas-outlet diaphragm*, and an excess-pressure relief-valve intermediate said *gas*-inlet chamber and said venting chamber *and* arranged to be opened *by said gas-inlet diaphragm* when the pressure of the gas in said inlet chamber exceeds the selected range of operating pressure.

3. A *suction-responsive* [dry gas feed] *dry-feed gas-inducting* system including [vacuum-producing means] *a suction producing liquid-ejector having a suction-inlet*, a gas-inlet chamber [a gas-outlet chamber, and balancing chamber in operative juxtaposition to said outlet chamber and in constant communication with the aforementioned inlet chamber], a vent*ing* chamber in operative juxtaposition [to said inlet chamber] *thereto* and vented to the atmosphere *and a gas-inlet diaphragm separating said two chambers*, a gas-inlet valve in *operative* communication with said *gas-inlet chamber* [a gas-outlet valve in communication with said outlet chamber and with said vacuum-producing means] *and arranged to be operated in one direction by said gas-inlet diaphragm, a gas-outlet chamber, a chamber in operative juxtaposition thereto and a gas-outlet diaphragram separating said two chambers, a passageway forming a constant communication between said gas-inlet chamber and said gas-outlet chamber*, [and] a rate-valve operatively [interposed between said inlet chamber and said outlet chamber, said inlet valve being arranged to be opened by the vacuum produced by said vacuum-producing means, means for maintaining a generally constant pressure-differential between said outlet chamber and said balancing chamber] *disposed in said passage-way, a gas-outlet valve in operative communication with said gas-outlet chamber and with the suction-inlet of said liquid-ejector and arranged to be opened by said gas-outlet diaphragm*, and an excess-vacuum relief-valve *intermediate said gas-inlet chamber and said venting chamber and* arranged to *be* opened *by said gas-inlet diaphragm* when the vacuum exceeds the selected range of operating vacuum.

4. A [dry gas feed] *suction-responsive dry-feed gas-inducting* system including [vacuum-producing means] *a suction-producing liquid-ejector having a suction-inlet,* a gas-inlet chamber [a gas-outlet chamber, and balancing chamber in operative juxtaposition to said outlet chamber and in constant communication with the aforementioned inlet chamber], a vent*ing* chamber in operative juxtaposition [to said inlet chamber] *thereto* and vented to the atmosphere *and a gas-inlet diaphragm separating said two chambers,* a gas-inlet valve in *operative* communication with said *gas*-inlet chamber [, a gas-outlet valve in communication with said outlet chamber and with said vacuum-producing means] *and arranged to be operated in one direction by said gas-inlet diaphragm, a gas-outlet chamber, a chamber in operative juxtaposition thereto and a gas-outlet diaphragm separating said two chambers, a passageway forming a constant communication between said gas-inlet chamber and said gas-outlet chamber,* [and] a rate-valve operatively [interposed between said inlet chamber and said outlet chamber, said inlet valve being arranged to be opened by the vacuum produced by said vacuum-producing means, means for maintaining a generally constant pressure-differential between said outlet chamber and said balancing chamber] *disposed in said passageway, a gas-outlet valve in operative communication with said gas-outlet chamber and with the suction-inlet of said liquid-ejector and arranged to be operated in one direction by said gas-outlet diaphragm,* an excess-pressure relief-valve intermediate said *gas*-inlet chamber and said venting chamber [,] *and* arranged to be opened *by said gas-inlet diaphragm,* when the pressure of the gas in said inlet chamber exceeds the selected range of operating pressure, and an excess-vacuum relief-valve arranged to open when the vacuum exceeds the selected range of operating vacuum.

5. A dry-feed chlorinator including a suction-producing water-ejector having a water-inlet, a water-discharge outlet and a suction-inlet, *a suction-responsive feed-regulator including a housing having therein* a chlorine-inlet chamber, a venting chamber in operative juxtaposition to said inlet chamber, a spring-seated chlorine-inlet valve in communication with said inlet chamber, pressure-sensitive [means] *diaphragm* intermediate said inlet chamber and said venting chamber and arranged to unseat said inlet valve and to overbalance the force of the spring of said inlet valve when the difference in pressure between said inlet chamber and said venting chamber exceeds a predetermined value, an outlet chamber, a balancing chamber in operative juxtaposition to said outlet chamber, a variable orifice intermediate said inlet chamber and said outlet chamber and operatively interposed therebetween to form a variable orifice therebetween, an outlet-orifice in communication with said outlet chamber and being operatively interposed between said outlet chamber and the suction-inlet of said water-ejector, pressure sensitive [means] *diaphragm* intermediate said outlet chamber and said balancing chamber and affected by the respective pressures in said chambers, means carried by said last-mentioned pressure-sensitive [means] *diaphragm* in operative juxtaposition to the aforesaid outlet-orifice for varying the effective opening thereof, and a spring urging said last-mentioned [pressure-sensitive means] *diaphragm* away from said outlet-orifice.

6. A dry-feed chlorinator including a suction-producing water-ejector having a water inlet, a water-discharge outlet and a suction-inlet, a chlorine-inlet chamber, a venting chamber in operative juxtaposition to said inlet chamber, a spring-seated chlorine-inlet valve in communication with said inlet chamber, *a* pressure-sensitive [means] *valve-operator* intermediate said inlet chamber and said venting chamber and arranged to unseat said inlet valve and to overbalance the force of the spring of said inlet valve when the difference in pressure between said inlet chamber and said venting chamber exceeds a predetermined value, an outlet chamber, a balancing chamber in operative juxtaposition to said outlet-chamber, a variable orifice intermediate said inlet chamber and said outlet chamber and operatively interposed therebetween to form a variable-orifice therebetween, an outlet orifice in communication with said outlet chamber and being operatively interposed between said outlet chamber and the suction-inlet of said water-ejector, *a* pressure sensitive [means] *valve-operator* intermediate said outlet chamber and said balancing chamber and affected by the respective pressures in said chambers, [means] *a valve-member* carried by said last-mentioned pressure-sensitive [means] *valve-operator* in operative juxtaposition to the aforesaid outlet orifice for varying the effective opening thereof, a spring urging said last-mentioned pressure-sensitive [means] *valve-operator* away from said outlet orifice, and an excess-vacuum relief-valve operatively interposed between said [balancing] *inlet* chamber and said venting chamber *and operatively juxtaposed to said first-mentioned pressure-sensitive valve-operator* and arranged to be opened *thereby* when the vacuum exceeds the selected operating-range of vacuum.

7. A dry-feed chlorinator including a suction-producing water-ejector having a water-inlet, a water-discharge outlet and a suction inlet, a chlorine-inlet chamber, a venting chamber in operative juxtaposition to said inlet chamber, a spring-seated chlorine-inlet valve in communication with said inlet chamber, *a* pressure-sensitive [means] *inlet-diaphragm* intermediate said inlet chamber and said venting chamber and arranged to unseat said inlet valve and to overbalance the force of the spring of said inlet valve when the difference in pressure between said inlet chamber and said venting chamber exceeds a predetermined value, an outlet chamber, a balancing chamber in operative juxtaposition to said outlet chamber, a variable orifice intermediate said inlet chamber and said outlet chamber and operatively interposed therebetween to form a variable-orifice therebetween, an outlet orifice in communication with said outlet chamber and being operatively interposed between said outlet chamber and the suction-inlet of said water-ejector, pressure-sensitive [means] *outlet diaphragm* intermediate said outlet chamber and said balancing chamber and affected by the respective pressures in said chambers, [means] *a valve-member* carried by said [last-mentioned pressure-sensitive means] *outlet diaphragm* in operative juxtaposition to the aforesaid outlet orifice for varying the effective opening thereof, a spring urging said [last-mentioned pressure-sensitive means] *outlet diaphragm* away from said outlet orifice, and an excess-pressure relief-valve operatively interposed between said inlet chamber and said venting chamber *and operatively juxtaposed to said inlet diaphragm* and arranged to [open] *be opened thereby* when the pressure in said inlet chamber exceeds the selected operating-range of pressure in said inlet chamber.

8. A dry-feed chlorinator including a suction-producing water-ejector having a water inlet, a water-discharge outlet and a suction inlet, a chlorine-inlet chamber, a venting chamber in operative juxtaposition to said inlet chamber, a spring-seated chlorine-inlet valve in communication with said inlet chamber, *a* pressure-sensitive [means] *inlet diaphragm* intermediate said inlet chamber and said venting chamber and arranged to unseat said inlet valve and to overbalance the force of the spring of said inlet valve when the difference in pressure between said inlet chamber and said venting chamber exceeds a pre-determined value, an outlet chamber, a balancing chamber in operative juxtaposition to said outlet chamber, a variable orifice intermediate said inlet chamber and said outlet chamber and operatively interposed therebetween to form a variable-orifice therebetween, an outlet orifice in communication with said outlet chamber and being operatively interposed between said outlet chamber and the suction-inlet of said water-ejector, *a* pressure sensitive [means] *outlet diaphragm* intermediate said outlet chamber and said balancing chamber and affected by the respective pressures in said chambers, means carried by said [last-mentioned pressure-sensitive means] *outlet diaphragm* in operative juxtaposition to the aforesaid outlet orifice for varying the effective opening thereof, a spring urging said [last-mentioned pressure-sensitive means] *outlet diaphragm* away from said outlet orifice, an excess-vacuum relief-valve operatively interposed between said [balancing] *inlet* chamber and said venting chamber and arranged to be opened when the vacuum exceeds the selected operating-range of vacuum, and an excess-pressure relief-valve operatively interposed between said inlet chamber and said venting chamber *and operatively juxtaposed to said inlet diaphragm* and arranged to be opened *thereby* when the pressure in said inlet chamber exceeds the selected operating-range of pressure in said inlet chamber.

9. A dry-feed system for introducing a minor fluid into a major moving stream of fluid, including a vacuum-producing fluid-operated ejector having a fluid inlet, a fluid discharge, and having a vacuum inlet, a fluid-supply regulator having (a) a fluid inlet adapted to be connected to a source of the minor fluid under pressure, (b) a fluid outlet connected to the vacuum-inlet of said ejector, (c) an inlet chamber, (d) a spring-seated valve between said fluid inlet and said inlet chamber operable in the direction opposite to the normal fluid-flow, (e) a venting chamber in operative juxtaposition to said inlet chamber, (f) a diaphragm intermediate said two chambers and forming the partition therebetween, (g) means for opening said inlet valve when said diaphragm is deflected in the direction of said inlet chamber and for closing the valve when deflected in the direction of said vented chamber, (h) an outlet chamber, (i) a balancing chamber in operative juxtaposition thereto, (j) a diaphragm intermediate said two chambers and forming the partition therebetween, (k) an outlet orifice communicating with said outlet chamber, (l) an outlet valve carried by said last-named diaphragm and arranged to vary the effective area of said outlet orifice responsive to the position to said diaphragm, (m) means establishing free communication between said inlet chamber and said balancing chamber, (n) a variable orifice capable of being set to any desired orifice-size, within its range of orifice-opening, operatively interposed between said inlet chamber and said outlet chamber and forming communication between said chambers, (o) high-pressure relief-valve operatively interposed between said inlet chamber and said venting chamber and arranged to be unseated when the first-mentioned diaphragm is moved excessively towards the venting chamber, and (p) a low-pressure vacuum relief-valve operatively interposed between said inlet chamber and said venting chamber and arranged to be opened when the first-named diaphragm moves excessively towards the inlet chamber.

10. A dry-feed chlorinator including a suction-producing water-ejector having a water-inlet, a water-discharge-outlet and a suction-inlet, a regulator-housing having therein a gas-inlet chamber, a gas-inlet valve communicating therewith and adapted to be connected to a source of chlorine-gas, a gas-outlet chamber having an outlet in communication with the suction-inlet of said water-ejector, a rate-valve intermediate said inlet-chamber and said outlet-chamber and communicating therewith and forming a variable orifice therebetween, a vent-chamber in operative juxtaposition to said inlet-chamber, a first pressure-sensitive movable partition-member between said inlet-chamber and said vent-chamber arranged to unseat said inlet-valve when the pressure therein falls below the selected pressure-range, a balancing-chamber in operative juxtaposition to said outlet-chamber and in constant communication with said inlet-chamber and in communication with said outlet-chamber through said rate-valve, a second pressure-sensitive movable partition-member between said outlet-chamber and said balancing chamber, an outlet-valve in operative juxtaposition to said outlet of said outlet-chamber and adapted variably to control the flow of gas through said outlet, said outlet-valve being arranged to be moved by said second pressure-sensitive partition-member so as to reduce the flow through said outlet when the pressure-differential between said outlet-chamber and said balancing-chamber changes towards a greater pressure in said outlet-chamber and a lesser pressure in the balancing-chamber, an excess-pressure relief-valve intermediate said inlet-chamber and said vent-chamber and arranged to be operated by said first pressure-sensitive partition-member so as to be opened when the pressure in the inlet-chamber exceeds the range selected therefor and to close when within said range, an excess-vacuum relief-valve intermediate said inlet-chamber and said vent-chamber and arranged to be operated by said first pressure-sensitive partition-member so as to open when the pressure within said inlet-chamber is below the range selected therefor and to close when within said range.

11. A chlorinator including a housing, a flow-regulator having an inlet chamber adapted to be connected with a source of chlorine under pressure and having an outlet chamber and having an intermediate port and a vent port, a suction-producing water-ejector having its suction-inlet connected with said outlet chamber, a variable-area rate-of-flow meter operatively interposed between said inlet chamber and said intermediate port a variable orifice operatively interposed between said intermediate port and said outlet chamber, said variable-area meter including a generally vertical metering tube mounted in a recess in said housing, an upper and a lower tube-[clamping] *sealing* member carried by said housing and adapted sealingly to [abut] *engage* against [the] *sealing surfaces at opposite* ends of said tube, one of said tube-[clamping] *sealing* members being movable and [being spring-urged] *having means associated therewith to move it* in a tube-[clamping] *sealing* direction whereby said tube may be inserted into and removed from said housing by *axially* moving said *movable* tube-[clamping] *sealing* member [to compress the spring thereof] *away from the end of the tube.*

12. In a chlorinator including a suction-producing water-ejector and a flow-regulator intermediate the suction-inlet of said water-ejector and a source of chlorine under pressure, whereby chlorine is supplied to the water under sub-atmospheric pressure or vacuum, a variable-area rate-of-flow meter operatively disposed within the chlorine line of said chlorinator which is normally kept under sub-atmospheric pressure, as aforementioned, said meter including a pair of operatively aligned tube-[clamping] *sealing* members, each carrying a *radially-sealing* sealing element, [at least] one of said tube-[clamping] *sealing* member [being resiliently mounted and being spring-urged toward the other tube-clamping member,] *being arranged to permit a tube operatively disposed between the two tube-sealing members to be moved axially with respect to the other tube-sealing member a distance sufficient to disengage it therefrom,* and a metering-tube disposed between said two tube-[clamping] *sealing* members and sealed to said tube-[clamping] *sealing* members by the sealing elements thereof *bearing radially against a wall-surface of the tube* and held in place and in said sealed relation by [the pressure of] the aforementioned [spring-urged] tube-[clamping] *sealing* members, said flow-regulator including pressure-responsive means for automatically shutting off the chlorine-supply line at the high-pressure side thereof when any part of the chlorine line in said chlorinator which is at sub-atmospheric pressure is broken or interrupted, as, for instance, by the removal of said metering tube from between the tube-[clamping] *sealing* members.

References Cited in the file of this patent

UNITED STATES PATENTS

| | | |
|---|---|---|
| 1,073,467 | Birrell | Sept. 16. 1913 |
| 1,393,615 | Foltz | Oct. 11, 1921 |
| 2,165,342 | Campbell | Sept. 3, 1940 |
| 2,213,663 | Berard | Sept. 3, 1940 |
| 2,490,792 | Fischer | Dec. 13, 1949 |
| 2,637,690 | Everson | May 5, 1953 |
| 2,680,715 | Cook | June 8, 1954 |
| 2,684,838 | Rush | July 17, 1954 |
| 2,761,464 | Faust | Sept. 4, 1956 |
| 2,912,995 | Ulanovsky | Nov. 17, 1959 |